UNITED STATES PATENT OFFICE.

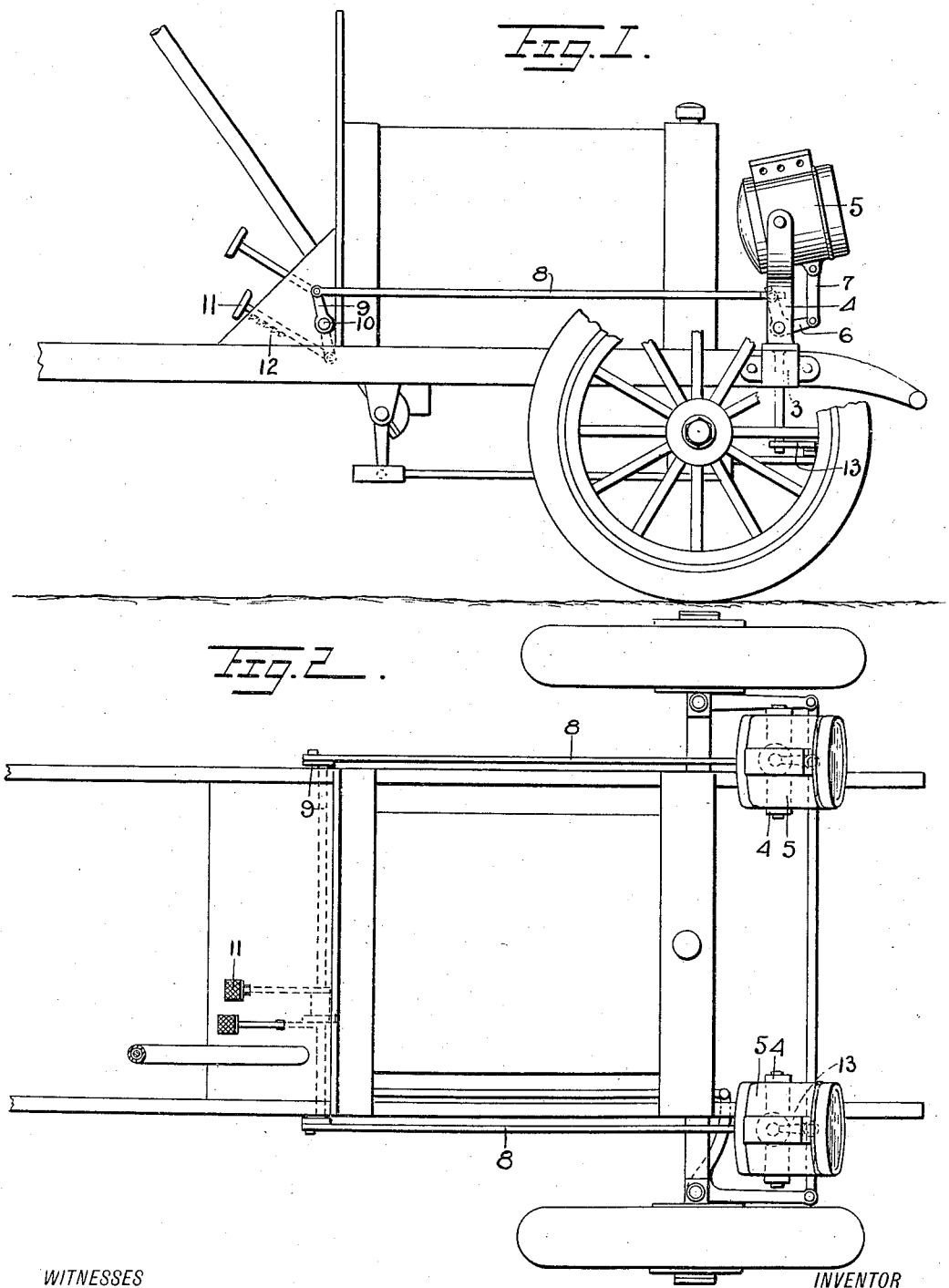

WILLIAM CHARLES SYKES, OF GREENSBURG, PENNSYLVANIA.

HEADLIGHT CONTROL.

1,138,424.  Specification of Letters Patent.  Patented May 4, 1915.

Application filed November 12, 1914. Serial No. 871,691.

*To all whom it may concern:*

Be it known that I, WILLIAM C. SYKES, a citizen of the United States, and a resident of Greensburg, in the county of Westmoreland and State of Pennsylvania, have invented a new and Improved Headlight Control, of which the following is a full, clear, and exact description.

The invention relates to head-lights for illuminating the road for vehicles.

An object thereof is to provide means for projecting a light downwardly or upwardly so as to illuminate a rising or descending road in front of the vehicle, whereby the steepness of the road can be easily brought to the view of the driver of the vehicle.

A further object of the invention is to provide means for casting the light to the sides of the vehicle when guiding the same.

A still further object of the invention is to provide a simple, strong and inexpensive arrangement for head-lights which can be easily and quickly operated when applied to a vehicle, and which arrangement will not require any alteration in the structure of the vehicle.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both the views, and Figure 1 is a side elevation of a vehicle provided with an embodiment of my invention; and Fig. 2 is a plan view thereof.

Referring to the drawings, 3 represents brackets secured to the sides of the chassis of the vehicle in each of which is mounted to turn in a vertical axis a bifurcated lamp support or yoke 4. In each of the supports a lamp 5 is mounted to swing in the horizontal axis. The lamps are so pivoted that the major part of their weight is in front, so that the lamp normally tends to fall with its front downward. Pivotally secured in the bifurcation of each support 4 is a bell-crank arm 6 one end of which is connected by a link 7 to the part of the lamp 5 lying in front of the bracket. The other end of the crank is connected through a universal joint to a rod 8, which rod is in turn connected to a crank 9, the two cranks being keyed or otherwise secured to a shaft 10 which can be turned in its bearings by means of a pedal 11, which pedal is provided with a series of teeth 12 forming stops for different positions of the lamps 5, so that the said lamps can be maintained in different fixed positions in a vertical plane. The ends of the supports 4 are made to project through the brackets 3 and are connected to the tie-rod, when the lamps are used for automobiles, by links 13. It is self-evident that when the head-lights are utilized with a vehicle of a different class the means for swinging the head-lights in the horizontal plane can be obtained by any other suitable means.

It will be seen that when the vehicle is steered the head-lights 5 will follow the movement of the vehicle and illuminate that part of the road to which the turn is made. By operating the pedal 11 the head-lights can be made to throw light toward the ground or away from the ground and be maintained in that position by the engagement of the teeth 12 with the board through which the pedal 11 projects.

From the foregoing description, taken in connection with the accompanying drawings, the advantage of the construction and operation of the device shown will be readily understood by those skilled in the art to which the invention pertains, and while I have described the principle of operation, together with the device which I now consider to be the best embodiment thereof, I desire to have it understood that the device shown is merely illustrative and that such changes may be made as are within the scope of the appended claims.

Having thus described my invention, I claim as new and desire to secure by Letters Patent:

1. In a vehicle head-light, a pair of supports each mounted to turn in the vertical plane, a lamp in each of said supports mounted to swing in a vertical plane so that the rays of light from the lamp can be thrown above and below the axis of the lamp, a pedal mechanism for swinging said lamps simultaneously in a vertical plane, said pedal having means whereby the same can be maintained in various predetermined positions, and means for turning said supports in unison at any positions of the pedal.

2. In a vehicle head-light control, a pair of supports each mounted to turn in a vertical plane, a lamp in each of said supports mounted to swing in a vertical plane, each of said lamps normally tending to fall with its front downward, a bell-crank arm pivotally secured to each of said supports, a link in front of the support connecting the lamp to the bell-crank arm, a pedal, means connecting the pedal to said bell-crank arms whereby the same is controlled, said pedal having means whereby the same can be maintained in predetermined positions, and means for turning the said lamp supports at any position of the pedal.

In testimony whereof I have signed my name to this specification in the presence of two subscribing witnesses.

WILLIAM CHARLES SYKES.

Witnesses:
MARY A. TRACY,
J. E. TRACY.